United States Patent Office 3,714,674
Patented Feb. 6, 1973

3,714,674
ROLLER PAINT APPLICATOR
Otello M. Simoncioni, 6527 Wuerpel St.,
New Orleans, La. 70124
Filed May 12, 1971, Ser. No. 142,660
Int. Cl. B44d 3/28
U.S. Cl. 15—230.11                     1 Claim

ABSTRACT OF THE DISCLOSURE

A length of cylindrical flexible hose adapted to rotate longitudinally around shafts respectively mounted in line in the oppositely disposed ends of said hose, said shafts defining an axis of rotation and being rotatably engaged by respective flexible arms of a bifurcated handle. A roller cover, comprising a plurality of cylindrical sections which are adapted to snugly fit over said roller, extends sequentially between said oppositely disposed ends. The combination of said flexible roller, sectioned roller cover and flexible arms allow the paint applicator to conform to the shapes of angular and curved surfaces for roller painting thereof, as well as for flat surfaces.

---

The invention relates generally to paint applicators and more particularly to roller applicators with flexibility to conform to flat, angular and curved surfaces for the application of paint thereto.

It is old in the art to mount a plurality of rigid roller segments on a flexible axle extending beyond the sequential length of the segments.

It is an object of the invention to provide a paint roller comprising a single flexible roller, two short rigid axles or shafts respectively mounted in end discs that are themselves mounted in the oppositely disposed ends of said roller.

Another object of the invention is to provide roller cover sections for sequentially mounting on said flexible roller.

Another object of the invention is to provide a bifurcated handle with flexible arms, the ends of which respectively engage an end axle to flexibly suspend said roller therebetween.

Figure 2:
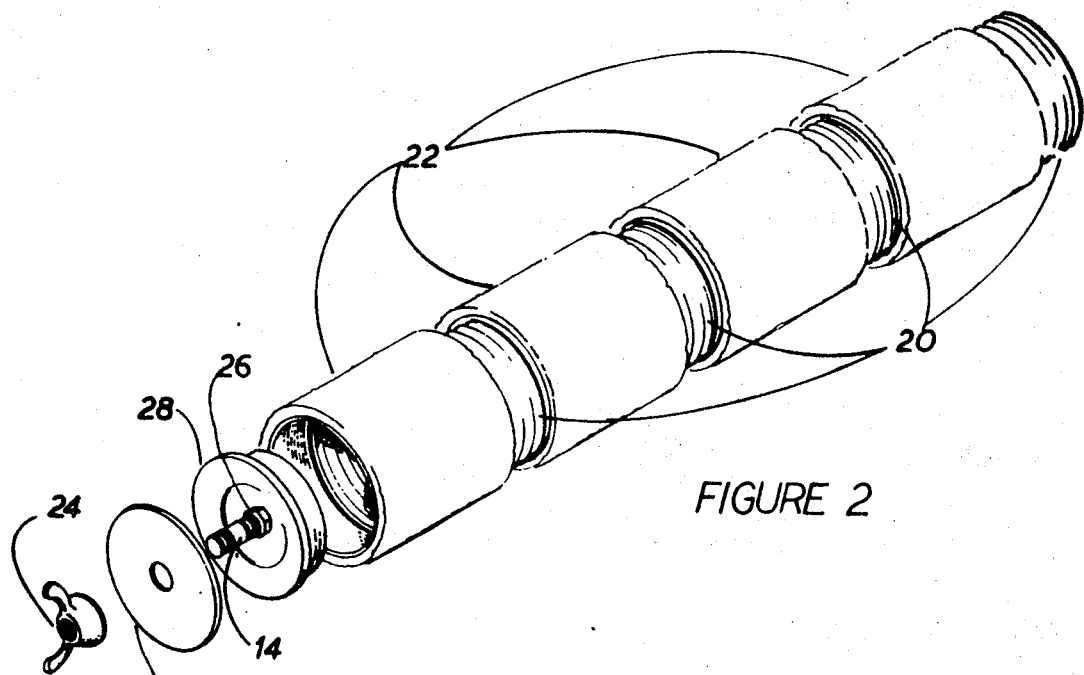
Figure 1:
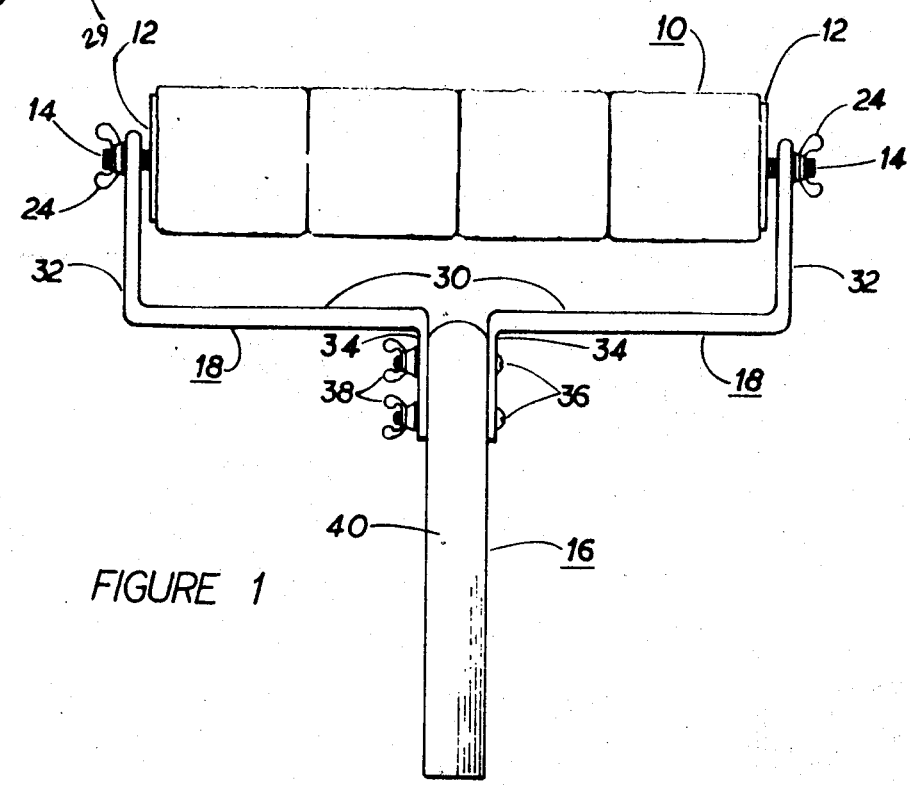

Other objects and a more complete understanding of the invention can be had by referring to the following description, claim and drawings in which:

FIG. 1 is a side elevation of the invention, and
FIG. 2 is perspective exploded view of the roller components.

Referring to FIG. 1 the invention comprises a covered flexible roller 10 having end closures 12. Short end axles 14 are centrally mounted in closures 12 and extend outwardly from each end of covered roller 10 to define the center longitudinal axis of rotation thereof. A bifurcated handle 16 having spaced apart arms 18 rotatably engages therebetween said covered roller 10 by means of the outwardly extending axles 14. The arms 18 are flexible, and in combination with the flexible covered roller 10, the covered roller will conform to substantially all surfaces against which it is pressed with the handle 16.

Referring to FIG. 2, the covered roller 10 comprises a short length of flexible hose 20 and a paint holding cover 22. The flexible hose is preferably of the type used with a vacuum cleaner, that is one having an open helical spring base covered or imbedded in flexible plastic and is unstretchable. The cover 22 for the hose roller is made of a pile type of inflexible fabric. It can be the same length as the flexible hose 20 for painting flat surfaces. For painting curved and angular surfaces, the cover comprises a plurality of separate sections in order that the flexibility of the roller is not inhibited by the inflexibility of the cover fabric.

The end closures 12 comprise a flanged plugs 28, each plug defining a center hole. The flanged part of a plug 28 is the same diameter as that of the covered roller 10. The unflanged part is adapted to fit snugly into the ends of the flexible hose 20 up to the flange part. The axles or shafts 14 comprise large headed carriage bolts having similar unthreaded sections for rotatively engaging in holes in the ends of the respective flexible arms 18. A carriage bolt is inserted in each of the holes defined in the plugs 28 to extend outwardly beyond the flanged part of the plugs. Nuts 26, threaded to engage the threaded portions of the bolts, are screwed thereon to compress the plugs 28 between the bolt head and the nut axially and thereby expand them diametrically to secure them in place in the ends of the covered roller 10. A washer 29 completes the end closure and prevents the nut 26 from being loosened by the ends of arms 18.

The handle 16 comprises two arms 18, each having an intermediate flexible leg 30 extending normal to and spacing apart parallel legs 32 and 34. The legs 32 of each arm 18 are respectively attached to axles 14 by wing nuts 24. A center holding part 40 is secured by bolts 36 and wing nuts 38 to legs 34. The legs 30 and 32 are flexible and the legs 34 are inflexible.

To use, the covered roller 10 is rolled in a roller paint container of variable depth and well known design (not shown) that is partially filled with paint at the deep end. The roller is then applied to the surface to be painted with sufficient pressure applied to the handle to flex the arms and conform the flexible covered roller to said surface.

What is claimed is:
1. An improved flexible roller paint applicator for painting flat and curved surfaces comprising in combination: unstretchably flexible roller means having a helical spring base embedded therein, said roller for rollably conforming axially to flat and curved surfaces; cylindrical sections of paint absorbing fabric means adapted in plurality to snugly fit over said roller means to reach from end to end for absorbing paint and remaining unwrinkled when said roller means is flexed; handle means having a pair of parallel flexible legs with spaced apart ends for axially engaging the respective ends of said roller means for rotatably mounting the roller means, and inwardly directed portions extending from said legs, said portions adapted to engage an inflexible handle centered therebetween and fastened thereto for forcing said roller means against a curved surface to axially conform thereto and said flexible legs to flex said spaced apart ends inward to avoid rupture of said roller means and separation thereof from said handle means.

References Cited

UNITED STATES PATENTS

| 3,246,357 | 4/1966 | Ammons | 15—230.11 |
| 3,609,051 | 9/1971 | Braun | 401—197 |
| 589,467 | 9/1897 | Davis | 15—210.5 |
| 2,903,731 | 9/1959 | Huhtala | 15—230.11 |
| 1,436,155 | 11/1922 | Domy | 29—121 A |
| 1,976,511 | 10/1934 | Piercy | 15—230.11 |
| 3,593,360 | 7/1971 | Coughlin | 15—230.11 |

FOREIGN PATENTS

| 848,193 | 9/1960 | Great Britain | 15—230.11 |
| 430,928 | 2/1948 | Italy | 401—197 |
| 828,727 | 2/1960 | Great Britain | 15—230.11 |

DANIEL BLUM, Primary Examiner